United States Patent Office 3,100,762
Patented Aug. 13, 1963

3,100,762
POST-HALOGENATION OF HALOGEN CONTAINING RESINS
Joseph C. Shockney, Cleveland, Ohio, assignor to The B. F. Goodrich Company, New York, N.Y., a corporation of New York
No Drawing. Filed Apr. 10, 1961, Ser. No. 101,654
9 Claims. (Cl. 260—92.8)

This invention relates to an improved process for the post-halogenation of polymeric vinyl halide resins and more particularly pertains to the improved process for the post-chlorination of high polymeric vinyl chloride resins.

Novel post-chlorinated vinyl chloride resins are more completely described in the copending U.S. patent application of Mark L. Dannis and Floyd L. Ramp, Serial No. 707,672, filed January 8, 1958, now U.S. Patent No. 2,996,489.

It is a primary object of this invention to provide a novel method for preparing vinyl polymer compositions having increased high temperature tolerance including good heat stability and materially increased softening or flow points.

Vinyl chloride resins have been made in both the hard, rigid, unplasticized condition and in the soft, flexible plasticized form. Both types suffer the principal disadvantage of being unusable at moderately elevated service temperatures, the plasticized resins being unusable at temperatures exceeding about 75° C. Some of the resins sag badly while others decompose badly at even moderately elevated temperatures. Polyvinyl chloride, in its unplasticized condition, is a stable, strong, rigid material that has an added advantage of not supporting combustion. However, this rigid material usually is not employed in structural applications at temperatures exceeding about 60 or 70° C. Polyvinylidene chloride is somewhat similar and, in addition, has a very low second order transition temperature of about —20° C. and is less stable to heat and light than polyvinyl chloride. Copolymers of these two monomers also have quite low softening points and poor stabilities. Blends of unplasticized polyvinyl chloride with one or more solid plasticizers, or resinous "processing aids," such as styrene-acrylonitrile copolymer, are more easily processed but are not sufficiently stable and soften at lower temperatures than is desirable for many applications.

A growing use for rigid and semi-rigid compositions of the type described is in the form of extruded pipe, tubing and cable jacketing. However, because of low softening or "sag" temperatures, polyvinyl chloride pipe has been utilized principally where corrosion resistance, weather resistance, light resistance, flame resistance, etc., render other rigid plastics unusable. There is a need, therefore, for a composition having all the above-mentioned excellent properties inherent in unplasticized polyvinyl chloride and, in addition having increased tolerance for high temperature including outstanding resistance to decomposition by heat, greater dimensional stability and materially increased softening temperatures.

It is another object of this invention to provide a novel method for simply and rapidly chlorinating polyvinyl chloride resins in conventional reactor equipment to yield products which have excellent resistance to common solvents and corrosive chemicals, excellent heat stability and unusually high softening or "sag" temperatures.

The prior art methods for post-chlorination of polyvinyl chloride resins include the chlorination of aqueous suspensions of the resin, chlorination of a solution of the resin in a chlorinated solvent such as carbon tetrachloride or tetrachloroethane, the chlorination of a dry, finely divided particulate resin with wet chlorine and various other modifications of these procedures as set forth in the text book "Vinyl and Related Polymers," by C. E. Schildknecht, John Wiley & Sons, Inc., New York, 1952, pages 412–413. The instant process represents an improvement over the method described in the aforementioned U.S. Patent No. 2,996,489, which involves the chlorination of a water suspension of a porous granular polyvinyl chloride resin in the presence of a swelling agent and photo-illumination and in the substantial absence of oxygen at a temperature below 65° C. and at about atmospheric pressure.

I have discovered a novel method for the post-chlorination of porous, granular polyvinyl chloride resin comprising adding chlorine to an aqueous suspension of a polyvinyl chloride resin in the presence of a chloromethane swelling agent and in the substantial absence of oxygen and actinic radiation at a temperature of from about 60 to 100° C. and a gauge pressure (that is to say a pressure in addition to normal atmospheric pressure) of from about 20 to about 80 p.s.i.

The polyvinyl chloride resins useful in the process of the present invention include thermoplastic polymers produced by the polymerization of a monomer mixture containing not less than about 70% by weight of vinyl chloride and more preferably 90% by weight of vinyl chloride. Thus, copolymers and interpolymers of vinyl chloride with minor amounts of 1-monoolefinic or vinyl type (i.e. containing a single $CH_2=C<$ grouping per molecule) comonomers can be utilized. Illustrative comonomers are vinylidene chloride, vinyl acetate, methyl acrylate, styrene, acrylonitrile, methyl methacrylate, ethylene, propylene and others. Polyvinyl chloride (i.e. the homopolymer of vinyl chloride) is most preferred.

The polyvinyl chloride resins useful in the process of this invention are prefered to be granular and somewhat porous in nature. A "macrogranular" resin is required to obtain the low slurry viscosity necessary for efficient agitation and to obtain low viscosity at high solids levels. It is necessary that the chlorination reaction medium be vigorously agitated in order to facilitate chlorine solution and distribution of the dissolved chlorine to each of the suspended resin particles. The preferred macro-granular resins embodied herein are those in which essentially all of the particles are above 10 microns and more preferably those in which a preponderance of the particles are above about 50 microns in diameter. The coarsely granular "general purpose" suspension polymerized grades of polymer containing particles up to 200 microns or more in diameter are perfectly satisfactory in the present process. It has also been found that porous resins increase the chlorination efficiency and lead to more stable products. The use of a porous resin in the present process facilitates the diffusion of the chlorine into the particle so that a homogeneously chlorinated product results. Solid, non-porous polymers must be highly swollen and even then heterogeneous products result when they are chlorinated by the instant process. For these and other reasons the polyvinyl chloride resins containing from about 5 to 50% by volume of pore space are strongly preferred.

As used herein the terms "specific viscosity" are calculated values derived from viscosity measurements. Solutions for viscometric study are prepared by dissolving 0.35 gram of the chlorinated resin in 25 ml. of tetrahydrofuran while mildly heating and agitating on a solution roller. The solutions are then filtered into an appropriate Ubbelhode viscosimeter, previously calibrated for the pure solvent. The flow time in seconds for the solutions are determined at four different dilutions to obtain flow data at a number of concentrations. A portion of the original filtered solution is dried to constant weight at 130° C. to obtain a true concentration value. The ratio of the flow time of the polymer solution to the flow time of the pure solvent is a value known as the "reduced viscosity." When the number (1) is subtracted from "reduced viscosity," one obtains the value known as the "specific viscosity." When the "specific viscosity" is divided by the concentration and the values obtained plotted against concentration, the extrapolation of the resulting straight line to zero concentration gives one the value known as "intrinsic viscosity." To be suitable in the process of the present invention, the polyvinyl chloride resin must have a minimum specific viscosity of at least as high as 0.40, more preferably at least about 0.45 and most preferably above about 0.50.

For greatly increased stability in the product of the process embodied herein, it is necessary to employ as the swelling agent a chloromethane, that is, a chlorinated hydrocarbon containing at least one chlorine atom, at least one hydrogen atom and only one carbon atom. Such materials include monochloro methane, dichloro methane and chloroform. In the production of chlorinated polyvinyl chloride resins of maximum heat stability and maximum softening temperature (for a given proportion of added chlorine) it is most preferred to employ chloroform as the swelling-wetting agent. Chloroform appears to be unique in that its use results in highly stable resins, and, further, it appears to have a pronounced directive effect on the chlorination reaction. Chloroform appears to act as a mild catalyst producing a rapid reaction between the chlorine and the resin. The mechanism by which chloroform functions is not understood. Products prepared using chloroform as swelling agent have intrinsic viscosities as high or higher than the original polyvinyl chloride resin which means that chlorination reaction is accompanied with substantially no polymer chain scission. Although the products are substantially insoluble in the common lacquer solvents such as acetone, esters, and aromatic hydrocarbons, they are completely soluble in hot tetrahydrofuran, hot cyclohexanone or hot chlorobenzene which proves that the consequent gain in molecular weight (and in intrinsic viscosity) is not due to cross-linking.

The preparation of polyvinyl chloride resin in the slurry-like reaction mixture may vary quite widely up to a concentration of about 35–40% by weight. No real lower limit on slurry solids content exists, although practical economic considerations require a minimum of not less than about 1–10%. High solids levels are possible with macro-granular resins whereas the use of extremely fine resins may exhibit prohibitively high viscosities at 10% or less of solids. This present preferred process has the inherent advantage of high output of product for a given unit volume of reactor space.

According to the process embodied herein the polyvinyl chloride resin starting material is suspended in an aqueous medium containing from about 2 to 25% by volume based on the total liquid content of said medium of the chloromethane swelling agent. The reaction temperature is maintained at from about 60° C. to about 90° C. in order to insure high-softening and stable products as well as a reasonable chlorination rate. The gauge pressure is maintained preferably in the range of from about 20 to 80 p.s.i. and oxygen is substantially excluded from the reactor. No catalyst such as photo-illumination is required under these improved conditions which is a decided advantage in the large scale production of stable after-chlorinated polyvinyl chloride resins. Inferior products are obtained under the foregoing reaction conditions when the chloromethane swelling agent is omitted from the reaction mixture.

Following the completion of the chlorination reaction, the polymer slurry is simply filtered or centrifuged to free it of the water phase and the filter cake is neutralized by the addition of a water-soluble base such as the sodium, potassium or ammonium hydroxides, carbonates, phosphates, etc. The neutralized polymer is then washed with pure water to neutrality to remove residual electrolyte. Drying of the washed cake can be carried out in air or vacuum ovens, by suspension driers, and the like employing temperatures that are preferably below about 75° C. The water-wetted filter cake can be washed with alcohol or acetone to displace the absorbed water and then the alcohol- or acetone-wetted polymer may be dried in a vacuum oven at moderate temperatures of about 50° C. When it is desired to recover the chloromethane and its chlorinated products, the reaction slurry can be steam distilled prior to the above-described workup.

In general the chlorinated products of the present invention which include those having densities of above 1.40 g./cc. at 25° C., up to 1.70 g./cc. and particularly those having densities of from about 1.43 to 1.65 should be stabilized to prevent degradation while working in other compounding ingredients on the mill. Usually from about 1 to about 10% by weight of a stabilizer will enable one to mix in other ingredients without careful precautions being observed. Many of the known organic or metal-organic stabilizers have lubricating action so that a stabilized composition would more readily coalesce into a sheet on a plastic mill, or to a well-fused solid in an extruder or a Banbury mixer. Dibutyl tin laurate, barium, cadmium, calcium, lead laurates and stearates, tin maleate types, epoxy type esters and polymers, and the like have this stabilizing action. Numerous other stabilizers such as those discussed in British Plastics, vol. 27, pages 176–9 (1954), as well as U.S. Patent No. 2,075,543 are operative in the products which result from the present process. Solids such as basic lead carbonate can also be added to contribute ready processability to the finished resin. Stabilized resins of this type are of markedly greater commercial utility than the raw resin. As pointed out above, products of this type are unique in having softening points at least 20° C. higher than unplasticized polyvinyl chloride and by a heat stability in air of at least 10 minutes and preferably at least 20 minutes at 400° F.

The chlorinated products of the process embodied herein may be plasticized in much the same manner as any other vinyl chloride polymers, although the usual polyvinyl chloride plasticizers are somewhat less effective in the chlorinated resins. It is surprising, however, that the aforementioned improved properties of the chlorinated products are maintained to such a large degree, upon being combined with plasticizers of all types. Filters, stabilizers, extenders, coloring dyes and pigments, mold-release agents, lubricants and other conventional additives also can be employed in the usual way.

In the following illustrative example the amounts of ingredients are given in parts by weight unless otherwise indicated.

EXAMPLE

The polyvinyl chloride resins were chlorinated as follows:

Into a reaction was charged 7 parts of a macrogranular polyvinyl chloride (about 80% conversion "Geon 101EP" type resin) and 59.5 parts of distilled water. The slurry is allowed to stand for a few hours to insure complete wetting of all the particles by the water. "Geon 101EP" is an easy processing, general purpose polyvinyl chloride made by the B. F. Goodrich Chemical Company, Cleveland, Ohio, having a specific viscosity of about 0.54. This polyvinyl chloride is fairly coarse, granular resin essentially all of which passes a 42 mesh screen and essentially all of which is retained on a 200 mesh screen. The preponderance of the particles are larger than 25 microns in diameter and they are porous. By actual measurement the pore space is about 15–20% by volume. Surface area determinations, by the nitrogen adsorption method, indicate that this resin has a total particle surface about equivalent to a polyvinyl chloride resin having particles only 1 to 3 microns in diameter.

The slurry was then agitated and a stream of nitrogen was blown through the slurry to purge the reactor system of air. The nitrogen purge was continued for ten minutes and then the reactor was evacuated to remove the nitrogen and the remaining traces of oxygen. After about 30 minutes the vacuum was turned off and 3.5 parts of chloroform were added to the reactor. The agitation was then increased and the contents of the reactor were brought to the reaction temperature. The reaction was then initiated by admitting chlorine from a cylinder into the reactor until the system reached the operating pressure and the rate of chlorine addition and the rate of cooling of the reactor were regulated so that the operating pressure and temperature remained constant throughout the reaction period. The reaction was discontinued after enough chlorine had been added to achieve the desired chlorination level in the polyvinyl chloride. The amount of chlorine used was determined by measuring the loss of weight in the chlorine cylinder.

Immediately upon the completion of the addition of chlorine the reactor and contents were rapidly cooled to about 25–35° C. Nitrogen was then blown through the slurry to remove the excess chlorine and the product was isolated. For the chlorination in which no chloroform was used, the reaction charge consisted of 7 parts of polyvinyl chloride resin and 63 parts of distilled water. The chlorination product was isolated by filtration and the solid was washed thoroughly with water and filtered again. The solid was then neutralized to a pH of 8 to 10 with a 10% aqueous solution of sodium carbonate. The product was washed again with water, filtered and finally the solid was slurried in methanol and agitated for 30 minutes before isolation on a filter and vacuum drying at 50° C. for 16 hours.

The foregoing post-chlorinated product was evaluated in the following manner: A two-gram sample of the resin was pressed into a button which was checked for density at 25° C. Next, standard dynamic extrusion tests ($T_1$ and $T_2$) were performed on one-gram samples of the resin. A sample of the resin was also mixed into a standard recipe containing 100 parts of resin, 3 parts Ferro 1827 (mixed barium-cadmium salts of a higher fatty acid as stabilizer) and 0.75 part of calcium stearate. The foregoing mixture was milled at 400° F. on a mill. The samples banded on one roll of the mill after approximately 2 or 3 minutes and they were allowed to mix, at temperature, another 2 to 3 minutes before the stocks were removed from the mill.

Two slabs of each of the foregoing stocks measuring 5" x 2" x ⅛" were rough cut for the heat distortion tests (ASTM D648) while the remainder of the stock was reworked to about 0.030" thickness so that 6" x ½" strips could be cut for heat stability tests. The slabs were inserted in a press, preheated for approximately 5 minutes, and molded for about 3 minutes at 420° F. Heat distortion bars measuring 5" x ½" x ⅛" were cut from the slabs and tested edgewise at 264 p.s.i. fiber stress on 4" supports. The temperature was increased at a rate of 2° C. per minute and the heat distortion temperature was recorded at the point when the bar had sagged 0.01".

The 6" x ½" strips were cut into about 6 parts and heat aged in a circulating air oven at 400° F. Samples were removed at 10, 20, 30, 40, 50 and 60 minutes. The heat stability value for a given sample was based on the length of time (estimated to 5 minutes) to which a sample could be exposed at 400° F. before blackening occurred.

The dynamic extrusion test is used to determine the "consolidation temperature" ($T_1$) and the "flow temperature" ($T_2$). In this test a sample of resin is placed in a temperature-controlled plunger cavity mold having an orifice in the bottom and a standard pressure is applied by means of the plunger. The cavity is then gradually heated until (1) the powder coalesces or consolidates to a solid mass ($T_1$) and (2) until the consolidated mass begins to flow through the orifice ($T_2$). The $T_1$ value is usually about 15° C. above what is more commonly known as a "second-order transition temperature."

The chlorination rate (which was found to be a first order reaction) was determined for each resin. The results of the foregoing preparation and tests are given in the following tables. The chlorination reaction was carried out at reaction temperatures of 50, 60, 80 and 95° C. and at pressures of 20, 40 and 80 p.s.i. At temperatures and pressures below these in the absence of ultraviolet illumination inferior products and excessively long reaction periods were obtained. The results of the tests and the properties of the products prepared in the foregoing manner are given in the following table.

*Table*

CHLOROFORM SWELLING AGENT, NO LIGHT

|  | A | B | C | D | E | F | G |
|---|---|---|---|---|---|---|---|
| Reaction temperature (° C.) | 50 | 60 | 60 | 60 | 60 | 60 | 80 |
| Reaction pressure (p.s.i.g.) | 40 | 20 | 40 | 40 | 40 | 80 | 40 |
| Product density (g./cc.) | 1.56 | 1.57 | 1.57 | 1.585 | 1.57 | 1.56 | 1.57 |
| Reaction rate $\times 10^3$ (min.$^{-1}$) | 4.76 | 5.35 | 9.04 | 10.47 | 9.04 | 41.0 | 17.51 |
| Dynamic extrusion ($T_1/T_2$, ° C.) | 135/170.5 | 137/172 | 137/175 | 138/175 | 137/175 | 126/174 | 131.5/166 |
| ASTM heat distortion temperature (° C.) | 105.8 | 112 | 109 | 111.5–111 | 109 | 107.5 | 108–108.5 |
| Heat stability at 400° F. (min.) | 20 | 30 | 20 | 20 | 20 | 30 | 30 |

|  | H | I | J | K | L | M | N |
|---|---|---|---|---|---|---|---|
| Reaction temperature (° C) | 80 | 95 | 60 | 60 | 80 | 95 | 95 |
| Reaction pressure (p.s.i.g.) | 80 | 40 | 40 | 80 | 40 | 40 | 80 |
| Product density (g./cc.) | 1.585 | 1.585 | 1.585 | 1.58 | 1.565 | 1.565 | 1.575 |
| Reaction rate $\times 10^3$ (min.$^{-1}$) | 58.6 | 2.62 | 10.79 | 19.95 | 12.44 | 2.55 | 50.6 |
| Dynamic extrusion ($T_1/T_2$, ° C.) | 132/169 | 132.5/181 | 138/173 | 133/170 | 134.5/171 | 137/174 | 123/165 |
| ASTM heat distortion temperature (° C.) | 114–111 | 109–108.5 | 111–111.5 | 110.5–110 | 112–113 | 108–109 | 108.5 |
| Heat stability at 400° F. (min.) | 20 | 20 | 20 | 20 | 30 | 20 | 20 |

The starting material, Geon 101EP type polyvinyl chloride, was found to have a density of 1.40 g./cc., $T_1/T_2$ of 95/154° C., an ASTM heat distortion temperature of 80° C. and a heat stability of less than 5 minutes at 400° F.

Attempted chlorination in the above manner in the absence of illumination at 65° C. and about atmospheric pressure required very long reaction periods because of the extremely slow reaction rate.

A product prepared in the foregoing manner substantially the same as B in the table except that the chlorination was conducted in the presence of ultraviolet illumination was found to have an ASTM heat distortion temperature of less than 105° C. Similarly, products prepared in substantially the same manner employed in the preparation of L and M of the table with the exception that ultraviolet illumination was used had heat distortion temperatures of 105.5 C. and 96.3° C., respectively.

Chlorination reactions carried out in the foregoing manner in the absence of both ultraviolet illumination and chloroform all gave inferior products. The products prepared in this manner corresponding to G, M and N in the table had heat distortion temperatures of 96° C., 101° C., 99° C. and heat stabilities of 5, 10 and 10 minutes, respectively.

Copolymers and interpolymers of vinyl chloride and other monomers such as vinyl esters, acrylate esters and vinyl ethers wherein 70% or more of vinyl chloride monomer is used are readily chlorinated by the foregoing procedure to yield high softening, heat stable products.

The densities of the foregoing products depend upon the amount of chlorine introduced into the product during the reaction. Excellent products having densities varying from about 1.43 to 1.65 g./cc. were prepared from Geon 101EP type resins in the foregoing manner.

I claim:

1. A non-catalytic process for producing chlorinated polyvinyl chloride resin having a density within the range of from about 1.43 to 1.65 grams/cc. at 25° C. comprising passing chlorine gas into an agitated suspension of a minor proportion of a macro-granular polyvinyl chloride resin having substantially all its particles above 10 microns in diameter, said particles containing between about 5 and about 50% by volume of pore space, in a major proportion of an aqueous medium containing about 5% to about 25% by volume, based on the total liquid content of said medium, of a chloromethane as a swelling agent while maintaining said suspension at a temperature of from 60 to 100° C. and a pressure of from 20 to 80 p.s.i.g. in the substantial absence of oxygen and photo-illumination, said polyvinyl chloride resin having a molecular weight at least equivalent to that of a polyvinyl chloride of specific viscosity 0.40, separating the solid, macro-granular product from said suspension and neutralizing said solid product, said product characterized by having a heat distortion temperature measured by ASTM Test Method D648 which is at least 20° C. higher than that of the unchlorinated polyvinyl chloride resin.

2. A non-catalytic process for producing chlorinated polyvinyl chloride resin having a density within the range of from about 1.43 to 1.65 grams/cc. at 25° C. comprising passing chlorine gas into an agitated suspension of a minor proportion of macro-granular particles of a polyvinyl chloride resin substantially all of said particles being larger than 10 microns in diameter and having from about 5 to about 50% by volume of pore space and a specific viscosity of at least 0.40, in a major proportion of an aqueous medium containing from about 5 to about 25% by volume, based on the total liquid content of said medium, of a chloromethane, maintaining said suspension at a temperature of from about 60 to 90° C. and a pressure of from about 20 to 80 p.s.i.g. in a substantially oxygen-free and photo-illumination free condition, separating a solid, macro-granular chlorinated product from said suspension, neutralizing said product and washing the neutralized product free of neutralizing agent, said product characterized by having a heat distortion temperature measured by ASTM Test Method D648 which is at least 20° C. higher than that of the unchlorinated polyvinyl chloride resin.

3. A non-catalytic process for producing chlorinated polyvinyl chloride resin having a density within the range of from about 1.43 to 1.65 grams/cc. at 25° C. comprising passing chlorine gas into an agitated suspension of macro-granular particles of a polyvinyl chloride resin with a specific viscosity of at least 0.40, substantially all of said particles being larger than 10 microns in diameter and having from about 5 to about 50% by volume of pore space and, in a major proportion of an aqueous medium containing from about 5 to about 15% by volume, based on the total liquid content of said medium, of chloroform, maintaining said suspension at a temperature of from about 60 to 90° C. and a pressure of from 20 to 80 p.s.i.g. in a substantially oxygen-free and photo-illumination-free condition, separating a solid, macro-granular chlorinated product from said suspension, neutralizing said product and washing the neutralized product free of neutralizing agent, said product characterized by having a heat distortion temperature measured by ASTM Test Method D648 which is at least 20° C. higher than that of the unchlorinated polyvinyl chloride resin.

4. A non-catalytic process for producing chlorinated polyvinyl chloride resin having a density within the range of from about 1.43 to 1.65 grams/cc. at 25° C. comprising passing chlorine gas into an agitated suspension of a minor proportion of a macro-granular polyvinyl chloride having substantially all its particles above 10 microns in diameter, said particles containing between about 5 and 50% by volume of pore space, in a major proportion of water containing about 5% to about 15% by volume, based on the volume of said water, of chloroform, while maintaining said suspension at a temperature of about 60° C. and a pressure of about 20 p.s.i.g. in the substantial absence of oxygen and photo-illumination said polyvinyl chloride having a molecular weight equivalent to a specific viscosity of 0.40, separating the solid, macro-granular product from said suspension and neutralizing said solid product, said product characterized by having a heat distortion temperature measured by ASTM Test Method D648 which is at least 20° C. higher than that of the unchlorinated polyvinyl chloride resin.

5. A non-catalytic process for producing chlorinated polyvinyl chloride resin having a density within the range of from about 1.43 to 1.65 grams/cc. at 25° C. comprising passing chlorine gas into an agitated suspension of a minor proportion of a macro-granular polyvinyl chloride having substantially all its particles above 10 microns in diameter, said particles containing between about 5 and 50% by volume of pore space, in a major proportion of water containing about 5% to about 15% by volume, based on the volume of said water, of chloroform, while maintaining said suspension at a temperature to about 60° C. and a pressure of about 40 p.s.i.g. in the substantial absence of oxygen and photo-illumination, said polyvinyl chloride having a molecular weight equivalent to a specific viscosity of 0.40, separating the solid, macro-granular product from said suspension and neutralizing said solid product, said product characterized by having a heat distortion temperature measured by ASTM Test Method D648 which is at least 20° C. higher than that of the unchlorinated polyvinyl chloride resin.

6. A non-catalytic process for producing chlorinated polyvinyl chloride resin having a density within the range of from about 1.43 to 1.65 grams/cc. at 25° C. comprising passing chlorine gas into an agitated suspension of a minor proportion of a macro-granular polyvinyl chloride having substantially all its particles above 10 microns in diameter, said particles containing between about 5 and 50% by volume of pore space, in a major proportion of water containing about 5% to about 15% by volume, based on the volume of said water of chloroform, while maintaining said suspension at a temperature of about 60° C. and a pressure of about 80 p.s.i.g. in the substantial absence of oxygen and photo-illumination, said polyvinyl chloride having a molecular weight equivalent to a specific viscosity of 0.40, separating the solid, macro-granular product from said suspension and neutralizing said solid product, said product characterized by having a heat distortion temperature measured by ASTM Test Method D648 which is at least 20° C. higher than that of the unchlorinated polyvinyl chloride resin.

7. A non-catalytic process for producing chlorinated polyvinyl chloride resin having a density within the range of from about 1.43 to 1.65 grams/cc. at 25° C. comprising passing chlorine gas into an agitated suspension of a minor proportion of a macro-granular polyvinyl chloride having substantially all its particles above 10 microns in diameter, said particles containing between about 5 and 50% by volume of pore space, in a major proportion of water containing about 5% to about 15% by volume, based on the volume of said water, of chloroform, while maintaining said suspension at a temperature of about 80° C. and a pressure of about 40 p.s.i.g. in the substantial absence of oxygen and photo-illumination, said polyvinyl chloride having a molecular weight equivalent to a specific viscosity of 0.40, separating the solid, macro-granular product from said suspension and neutralizing said solid product, said product characterized by having a heat distortion temperature measured by ASTM Test Method D648 which is at least 20° C. higher than that of the unchlorinated polyvinyl chloride resin.

8. A non-catalytic process for producing chlorinated polyvinyl chloride resin having a density within the range of from about 1.43 to 1.65 grams/cc. at 25° C. comprising passing chlorine gas into an agitated suspension of a minor proportion of a macro-granular polyvinyl chloride having substantially all its particles above 10 microns in diameter, said particles containing between about 5 and 50% by volume of pore space, in a major proportion of water containing about 5% to about 15% by volume, based on the volume of said water of chloroform, while maintaining said suspension at a temperature of about 80° C. and a pressure of about 80 p.s.i.g. in the substantial absence of oxygen and photo-illumination, said polyvinyl chloride having a molecular weight equivalent to a specific viscosity of 0.40, separating the solid, macro-granular product from said suspension and neutralizing said solid product, said product characterized by having a heat distortion temperature measured by ASTM Test Method D648 which is at least 20° C. higher than that of the unchlorinated polyvinyl chloride resin.

9. A non-catalytic process for producing chlorinated polyvinyl chloride resin having a density within the range of from about 1.43 to 1.65 grams/cc. at 25° C. comprising passing chlorine gas into an agitated suspension of a minor proportion of a macro-granular polyvinyl chloride having substantially all its particles above 10 microns in diameter, said particles containing between about 5 and about 50% by volume of pore space, in a major proportion of water containing about 5% to about 15% by volume, based on the volume of said water of chloroform, while maintaining said suspension at a temperature of about 95° C. and a pressure of about 80 p.s.i.g. in the substantial absence of oxygen and photo-illumination, said polyvinyl chloride having a molecular weight equivalent to a specific viscosity of 0.40, separating the solid, macro-granular product from said suspension and neutralizing said solid product, said product characterized by having a heat distortion temperature measured by ASTM Test Method D648 which is at least 20° C. higher than that of the unchlorinated polyvinyl chloride resin.

References Cited in the file of this patent

UNITED STATES PATENTS

| 2,981,720 | Herzberg et al. | Apr. 25, 1961 |
| 2,996,489 | Dannis | Aug. 15, 1961 |

FOREIGN PATENTS

| 427,792 | Italy | Nov. 27, 1947 |